United States Patent
Arakeri et al.

(10) Patent No.: US 12,138,758 B2
(45) Date of Patent: Nov. 12, 2024

(54) WEAR SLEEVE REMOVAL TOOL FOR ROTORCRAFT

(71) Applicant: Textron Innovations Inc., Providence, RI (US)

(72) Inventors: Vitthal Vishnuthreeth Arakeri, Bangalore (IN); Alvin Jones, Fort Worth, TX (US)

(73) Assignee: Textron Innovations Inc, Providence, RI (US)

( * ) Notice: Subject to any disclaimer, the term of this patent is extended or adjusted under 35 U.S.C. 154(b) by 0 days.

(21) Appl. No.: 17/724,833

(22) Filed: Apr. 20, 2022

(65) Prior Publication Data

US 2023/0339084 A1  Oct. 26, 2023

(51) Int. Cl.
  *B25B 27/06*  (2006.01)
  *B64F 5/40*  (2017.01)
(52) U.S. Cl.
  CPC .............. *B25B 27/062* (2013.01); *B64F 5/40* (2017.01)
(58) Field of Classification Search
  CPC ......... B25B 11/00; B25B 27/14; B25B 27/28; B25B 27/02; B25B 27/023; B25B 27/06; B25B 27/062; B23P 15/003; F16C 43/02; B64F 5/40; Y10T 29/53861; Y10T 29/53848; Y10T 29/538; Y10T 29/5383; Y10T 29/53657; Y10T 29/53796; Y10T 29/53843; Y10T 29/53839; Y10T 29/53852
  USPC ...... 29/244, 256, 258, 259, 263, 426.5, 255, 29/278; 269/278
  See application file for complete search history.

(56) References Cited

U.S. PATENT DOCUMENTS

| | | | | |
|---|---|---|---|---|
| 4,003,119 | A * | 1/1977 | Hugh | B25D 1/16 29/254 |
| 4,426,758 | A * | 1/1984 | Castoe | B25B 27/023 29/265 |
| 4,724,608 | A * | 2/1988 | Parrott | B25B 27/023 29/259 |
| 5,090,102 | A * | 2/1992 | Lovell | B25B 27/06 29/255 |
| 5,276,951 | A * | 1/1994 | Gluszek | E05B 19/20 29/265 |
| 5,890,271 | A * | 4/1999 | Bromley | B25B 27/28 29/280 |
| 8,276,252 | B2 * | 10/2012 | Liu | B25B 27/02 29/244 |
| 9,579,779 | B1 * | 2/2017 | Hunter | B25B 27/06 |
| 10,265,839 | B1 * | 4/2019 | Hunter | B25B 27/026 |
| 10,668,604 | B2 * | 6/2020 | Caywood | B64F 5/40 |

(Continued)

*Primary Examiner* — Robert F Neibaur
(74) *Attorney, Agent, or Firm* — Akona IP PC

(57) ABSTRACT

Various implementations described herein are directed to a device having a puller tool assembly for removing a wear sleeve from a tail-rotor hub assembly of a rotorcraft. The puller tool assembly may have an interior shaft slidably engaged within an exterior cylindrical body. The puller tool assembly may have a restraint cap coupled to the interior shaft at a first end of the exterior shaft with a fastener. The puller tool assembly may have a mandrel coupled to the interior shaft at a second end of the exterior shaft. The exterior cylindrical body may be inserted within the wear sleeve between the restraint cap and the mandrel. The mandrel may expand to grasp the wear sleeve when the exterior shaft is tightened so as to pull the wear sleeve toward the restraint cap.

13 Claims, 11 Drawing Sheets

(56) References Cited

U.S. PATENT DOCUMENTS

| | | | |
|---|---|---|---|
| 11,383,365 B1* | 7/2022 | Huang | B25B 27/062 |
| 2019/0032736 A1* | 1/2019 | Muleski | B25B 27/14 |

* cited by examiner

WEAR SLEEVE REMOVAL TOOL FOR ROTORCRAFT

STATEMENT REGARDING FEDERALLY SPONSORED RESEARCH OR DEVELOPMENT

Not applicable.

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional designs, helicopters typically have a main rotor system and a tail rotor system, and due to the high-impact rotation during operational use of the helicopter, the tail rotor system may require periodic maintenance for safety reasons. However, in reference to conventional maintenance procedures, the tail rotor gear box is completely uninstalled so as to access various components of the tail rotor system, wherein this excessively laborious task needs a significant amount of time to persistently maintain these various components of the tail rotor system. Since every movement counts, rotorcraft maintenance must be kept in a constant state of readiness for every mission. Thus, there exists a need to improve various conventional maintenance procedures for some components related to the tail rotor system that will provide for safe, intelligible and quick replacement of worn components.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein relate to wear sleeve removal schemes and techniques for a rotorcraft, such as, e.g., a helicopter or similar aircraft. Also, the various wear sleeve removal schemes and techniques may be used to provide a safe, intelligible and expeditious way to remove (or withdrawal) the wear sleeve form the tail rotor hub assembly of a rotorcraft. Thus, various implementations described herein provide a novel wear sleeve removal tool that may be utilized to rapidly uninstall the wear sleeve from the tail rotor hub assembly without completely uninstalling the tail rotor gear box from the rotorcraft. As shown and described herein, the wear sleeve removal tool (or sleeve puller tool) may have one or more collapsible sections or lugs that assist with slidably inserting the wear sleeve removal tool into (or within) the wear sleeve. The wear sleeve removal tool may also have a mandrel that holds and supports the collapsible lugs in place while retracting (or withdrawing) the wear sleeve from the tail rotor hub assembly with the sleeve removal tool.

Various implementations of wear sleeve removal schemes and techniques will now be described herein with reference to FIGS. 1-6 and 7A-7E.

Figure 1:
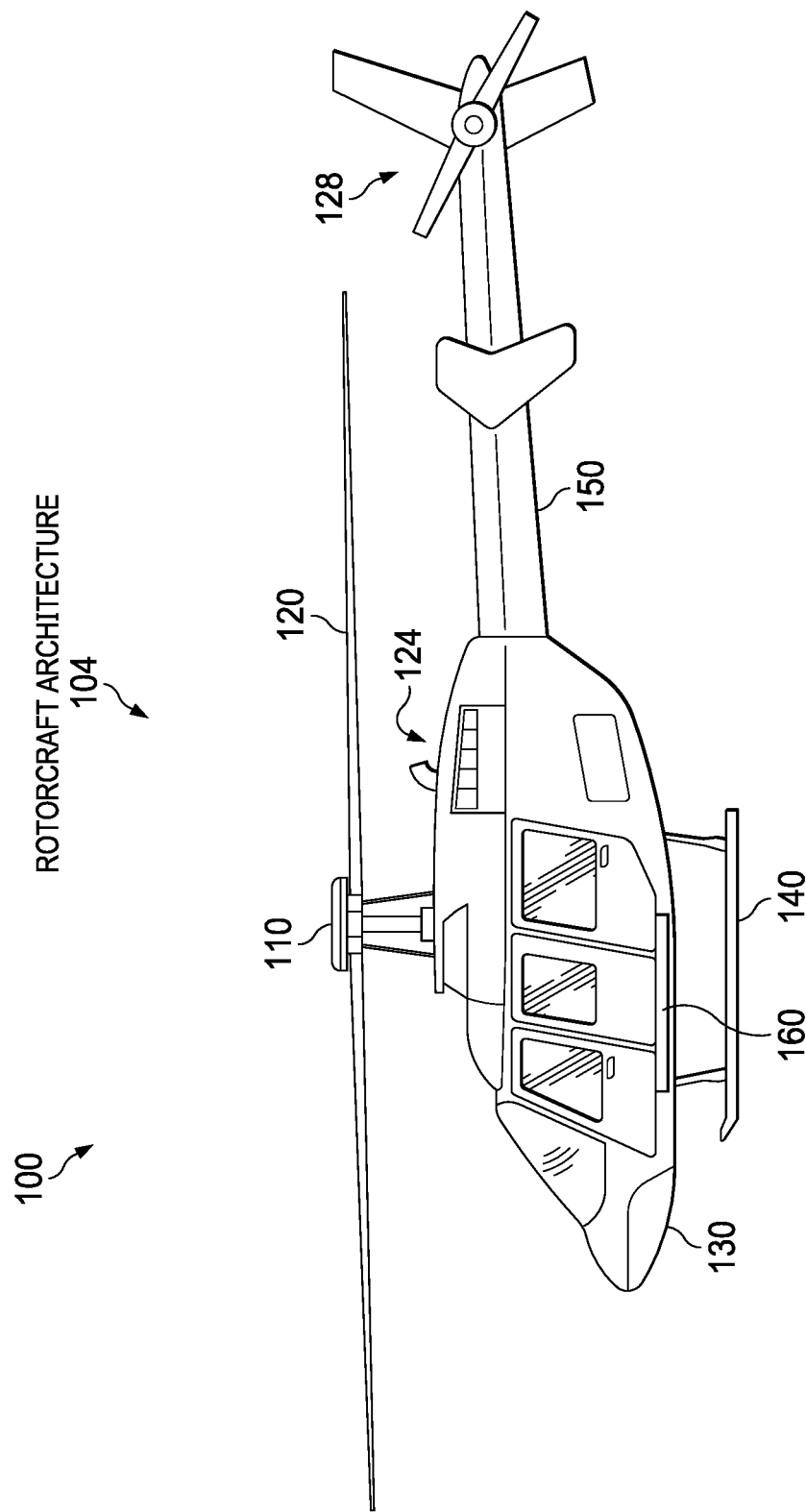
FIG. 1 illustrates a diagram of a rotorcraft architecture in accordance with various implementations described herein.

FIG. 1 illustrates a diagram 100 of rotorcraft architecture 104 in accordance with various implementations described herein. The rotorcraft architecture 104 may comprise an aircraft, such as, e.g., a helicopter or some other type of similar rotorcraft.

In some implementations, the rotorcraft architecture 104 refers to various types of rotary-wing aircraft, such as, e.g., rotorcraft, helicopter or similar. The rotorcraft 104 includes a main rotor system 110, one or more blades 120, a fuselage 130, landing gear 140, and an empennage 150. The main rotor system 110 is attached to an upper portion of the fuselage 130, and also, the main rotor system 110 has an engine compartment 124 with one or more engines arranged in various types of engine configurations. The main rotor system 110 may be configured to rotate the blades 120 during flight, and also, the main rotor system 110 may utilize a flight control system (not shown) for selectively controlling the pitch of each blade of the blades 120 so as to allow a pilot to selectively control direction, thrust, and/or lift of the rotorcraft 104. Also, the rotorcraft 104 may have a tail rotor system 128 that is configured to stabilize control of the rotorcraft 104 during flight and also to change horizontal orientation of the fuselage 130 around an axis pivot point defined by the center of the one or more blades 120 of the main rotor system 110.

As described in greater detail herein, the tail rotor system 128 includes a tail rotor assembly having a wear sleeve that needs to be periodically removed and replaced for safety and maintenance protocols. In various scenarios, the wear sleeve needs to be removed from a tail rotor gear box of the tail rotor assembly. Since aircraft maintenance is kept in readiness for every flight, the wear sleeve removal tool (or sleeve puller tool) as described herein offers substantial time savings for removing the wear sleeve from the tail rotor hub assembly without having to uninstall the tail rotor hub assembly and/or gear box from the rotorcraft 104.

Figure 2:
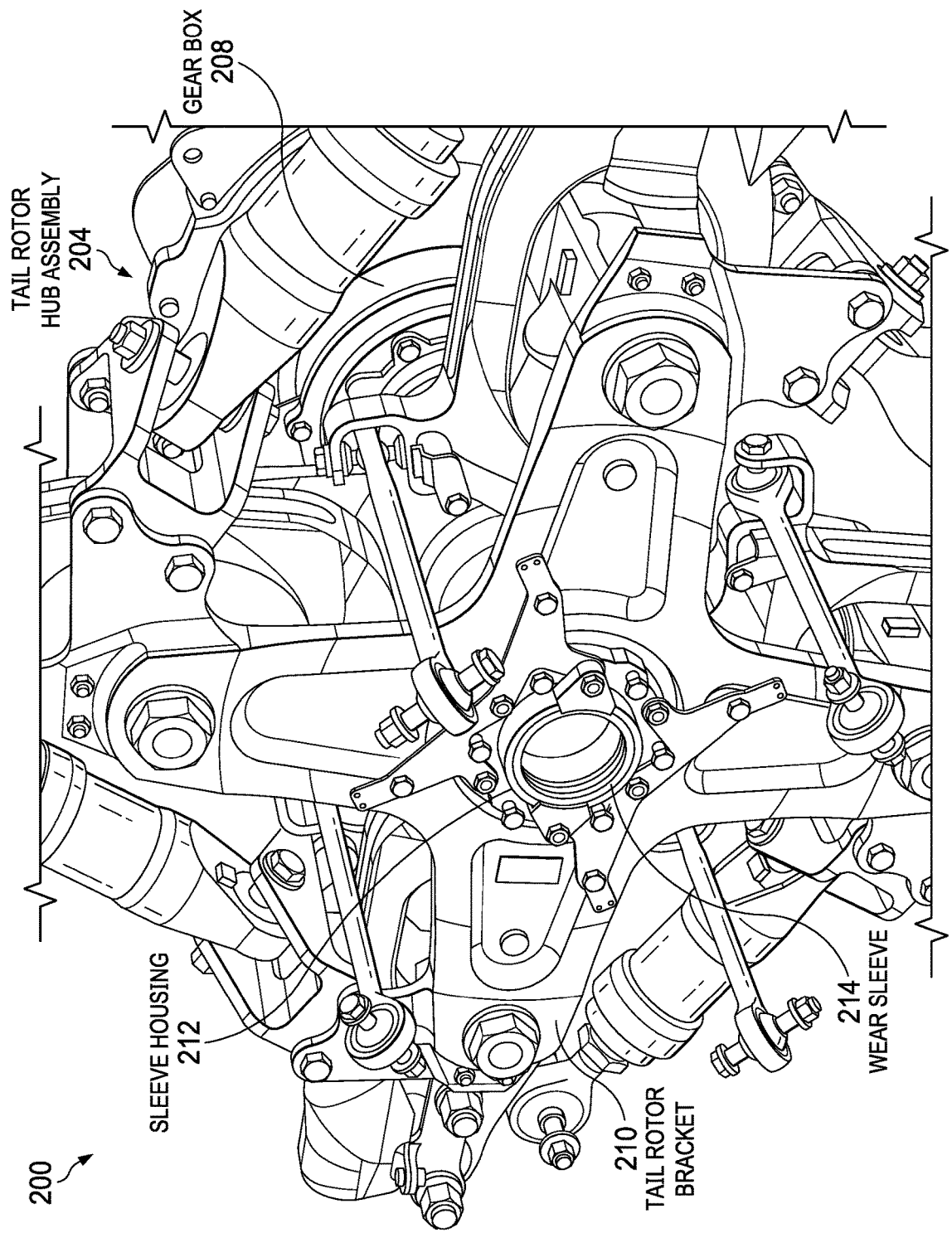
FIG. 2 illustrates a diagram of a tail rotor hub assembly having a wear sleeve in accordance with various implementations described herein.

FIG. 2 illustrates a diagram 200 of a tail rotor hub assembly 204 having a wear sleeve 214 in accordance with various implementations described herein.

In various implementations, as shown in FIG. 2, the tail rotor hub assembly 204 may have various components, including, e.g., a gear box 208, a tail rotor bracket 210, and a sleeve housing 212 that is configured to securely receive the wear sleeve 214. In various use-case scenarios, the wear sleeve 214 provides a shielding buffer sleeve between the tail rotor blades and the interior portion of the rotor bracket 210 as defined by the sleeve housing 212 for absorbing high-speed shock during rotation of the tail rotor blades. Also, in various implementations, the wear sleeve 214 may be formed of various high-impact materials, such, e.g., plastics, thermo-plastics, metals, alloys, and/or similar types of materials.

Figure 3:
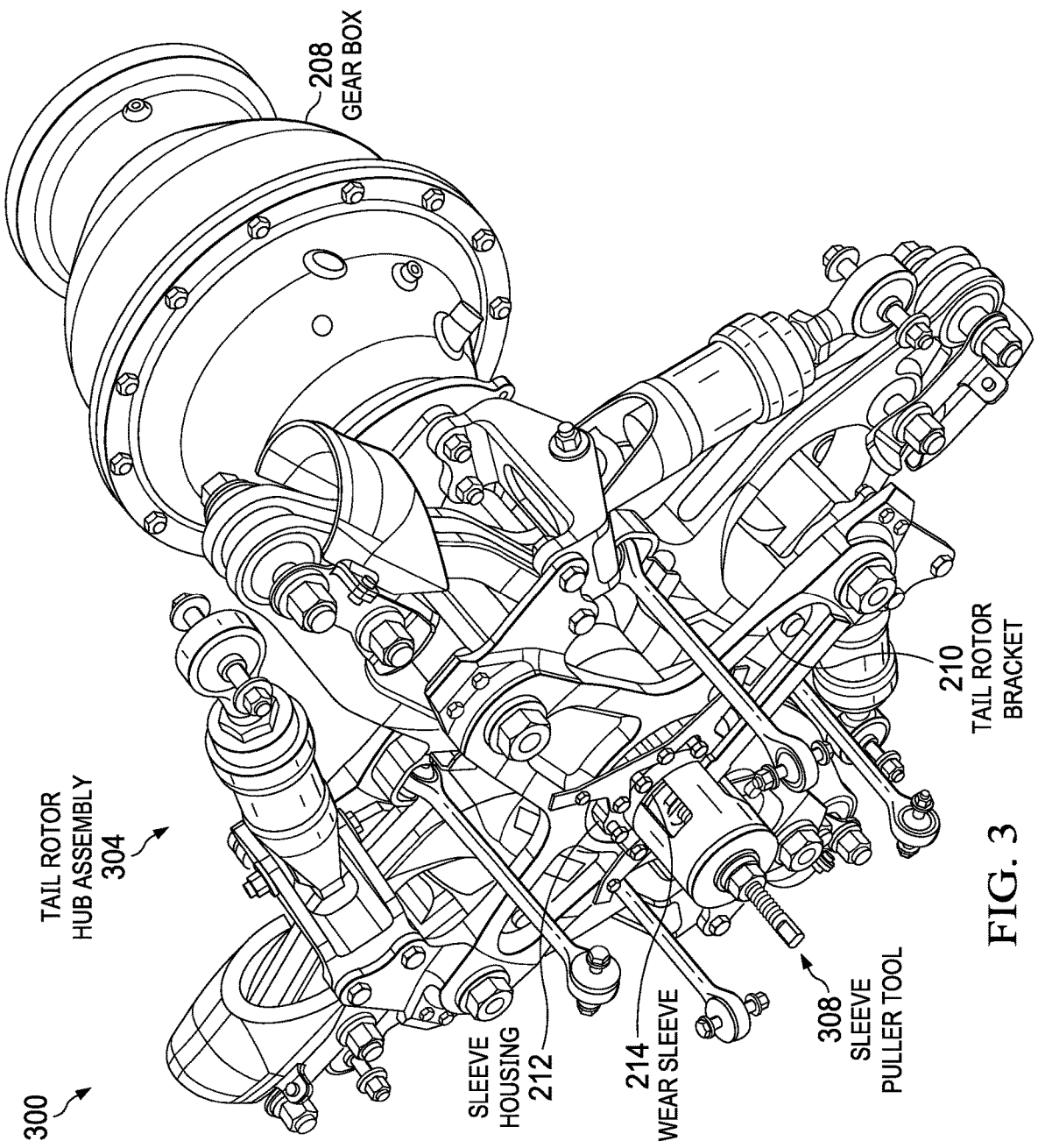
FIGS. 3-4 illustrate diagrams of a tail rotor hub assembly with insertion of a wear sleeve removal tool in accordance with various implementations described herein.
Figure 4:
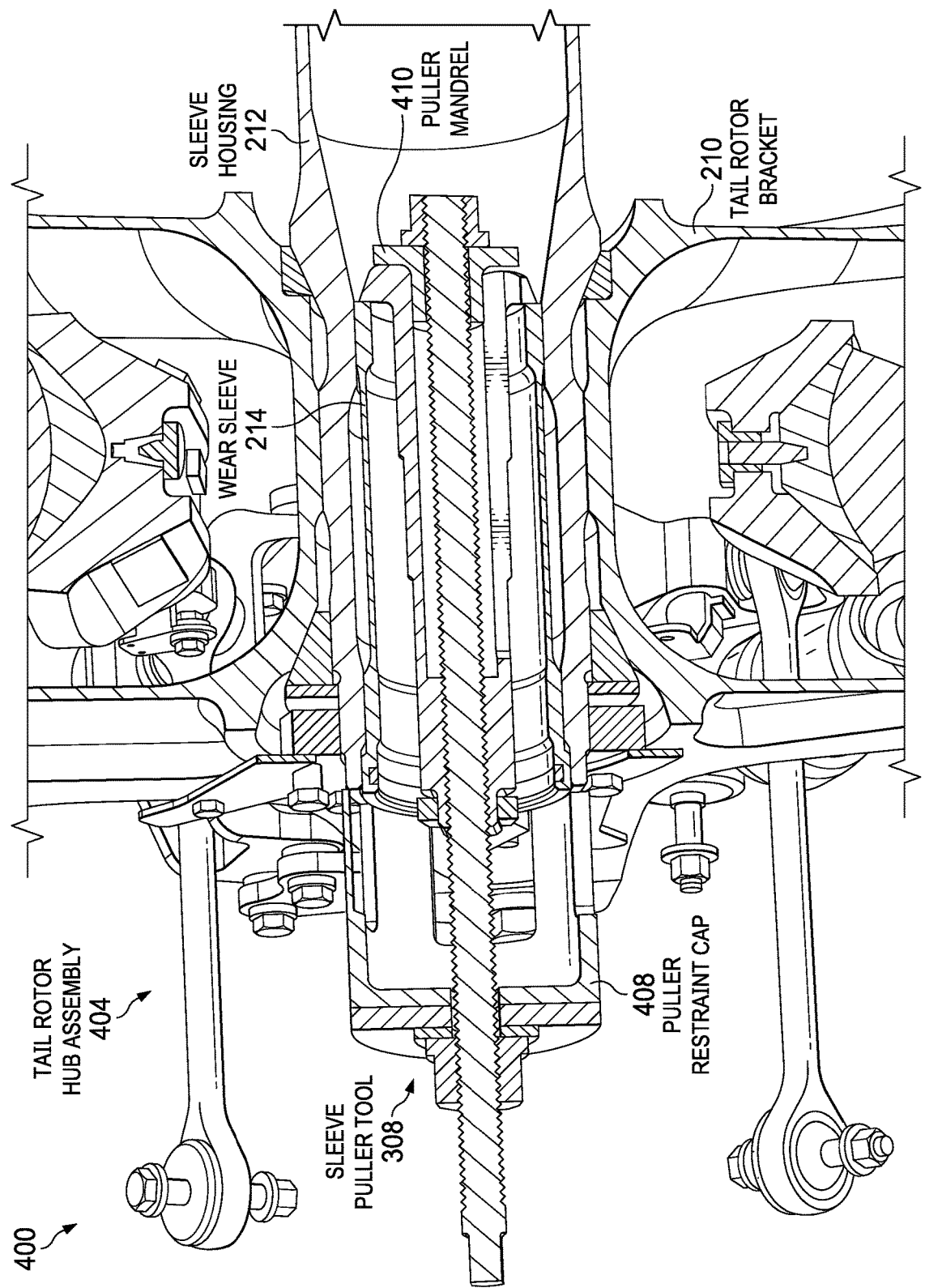

FIGS. 3-4 illustrate various diagrams of the tail rotor hub assembly with insertion of a wear sleeve removal tool (or sleeve puller tool) 308 in accordance with implementations described herein. In particular, FIG. 3 shows a diagram 304 of the tail rotor hub assembly 304 with insertion of the wear sleeve removal tool (or sleeve puller tool) 308 within the sleeve housing 212 of the tail rotor bracket 210, and also, FIG. 4 shows a cut-away diagram 404 of the tail rotor hub assembly 404 with insertion of the wear sleeve removal tool (or sleeve puller tool) 308 within the sleeve housing 212 of the tail rotor bracket 210.

As described herein and as shown in FIG. 3, the tail rotor hub assembly 204 may have various components, including, e.g., the gear box 208, the tail rotor bracket 210, and the sleeve housing 212 that is configured to securely receive the wear sleeve 214. In various use-case scenarios, the wear sleeve 214 provides a shielding buffer sleeve between the tail rotor blades and the interior portion of the rotor bracket 210 as defined by the sleeve housing 212 for absorbing high-speed shock during rotation of the tail rotor blades. Periodically, the wear sleeve 214 needs to be removed for maintenance purposes, and thus, the wear sleeve removal tool (or sleeve puller tool) 308 is inserted within a tubular cavity defined by an interior region of the wear sleeve 214 for subsequent withdrawal from the sleeve housing 212.

As shown in the cut-away view of FIG. 4, the wear sleeve removal tool (or sleeve puller tool) 308 may be inserted and positioned (or disposed) within the tubular cavity defined by the interior region of the wear sleeve 214. In some use-cases scenarios, the sleeve puller tool 308 is used to firmly grasp (or securely capture) the wear sleeve 214 by pinching (or by compressing) the wear sleeve 214 between peripheral components of the sleeve puller tool 308, such as, e.g., a puller restraint cap 408 and a puller mandrel 410. The sleeve puller tool 308 is described in greater detail herein below in reference to FIG. 5.

Figure 5:
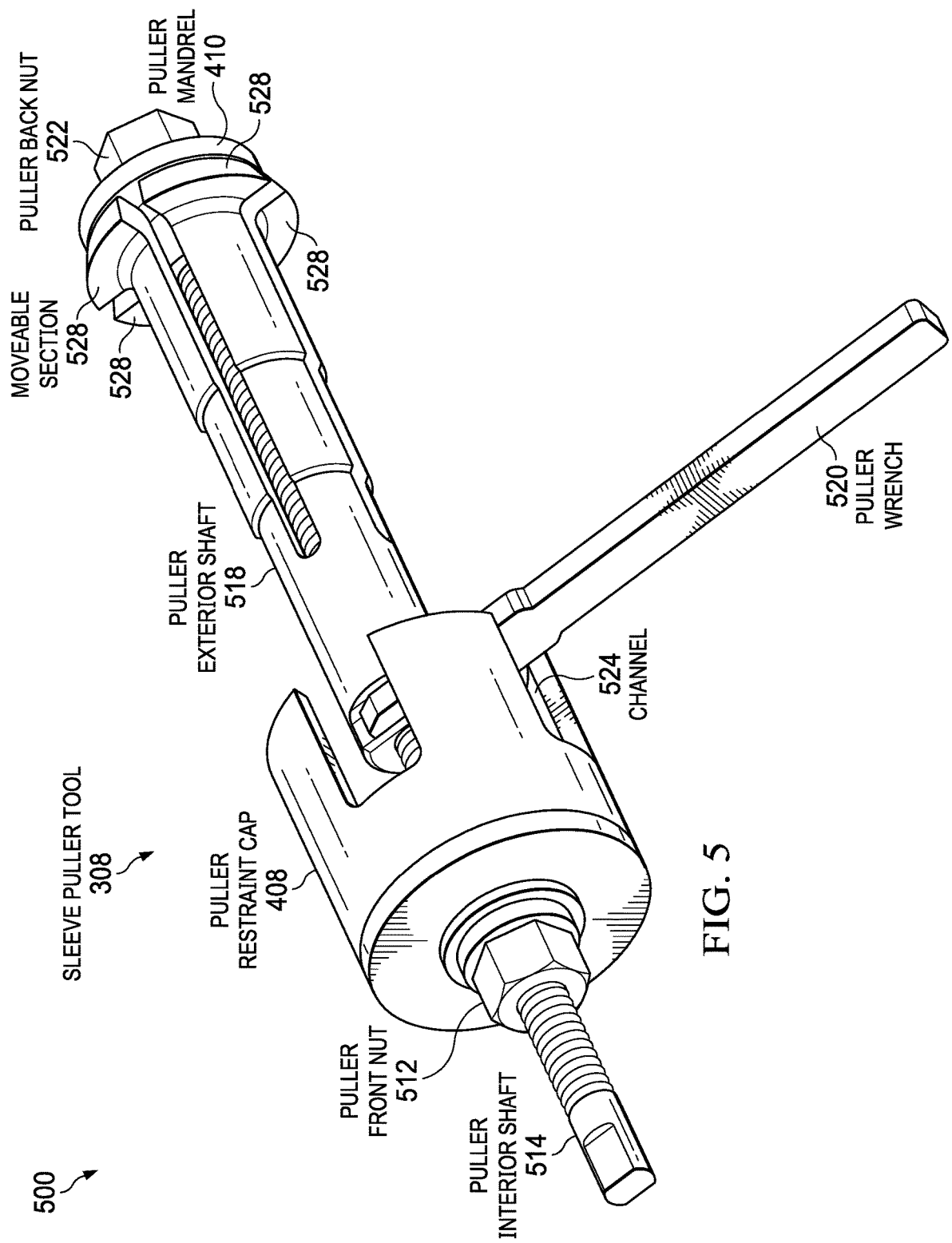
FIG. 5 illustrates a diagram of a wear sleeve removal tool or sleeve puller tool in accordance with various implementations described herein.

FIG. 5 illustrates a diagram 500 of a wear sleeve removal tool or sleeve puller tool 308 in accordance with various implementations described herein.

As shown in FIG. 5, the wear sleeve removal tool or sleeve puller tool 308 may refer to a device having various components, including, e.g., the puller restraint cap 408, the puller mandrel 410, a puller front fastener nut 512, a puller interior shaft 514, a puller exterior shaft 518, a puller back fastener nut 522, and a puller wrench armature 520. Also, in various implementations, the wear sleeve removal tool or sleeve puller tool 308 may refer to a puller tool assembly that is configured and arranged to remove (or withdrawal) the wear sleeve 214 from the tail rotor assembly 204, 304, 404 of the tail rotor system 128 of the rotorcraft 104 as described and as shown in reference to FIGS. 1-4.

In some implementations, as shown in FIG. 5, the sleeve puller tool 308 includes the exterior shaft 518 having a first cylindrical body with a hollow tubular passage disposed therethrough between a first open end and a second open end. The sleeve puller tool 308 includes the interior shaft 514 having a second cylindrical body slidably engaged within the hollow tubular passage of the exterior shaft 518. As such, i.e., the interior shaft 514 is slidably engaged within the exterior cylindrical body of the exterior shaft 518. The sleeve puller tool 308 also includes the restraint cap 408 coupled to the interior shaft 514 at the first end of the exterior shaft 518 with a first fastener (or puller front nut) 512. The sleeve puller tool 308 includes the mandrel 410 coupled to the interior shaft 514 at the second end of the exterior shaft 518 with a second fastener 522 (or puller back nut). Also, in some instances, the interior shaft 514 may have a threaded outer surface that is configured to communicate and receive both of the front nut 512 at a first end (or front end) of the interior shaft 514 and the back nut 522 at a second end (or back end) of the interior shaft 514.

In some implementations, as shown in reference to FIGS. 4-5, the second end of the exterior shaft 518 is inserted within the wear sleeve 214 of the tail-rotor hub assembly 404 so that the wear sleeve 214 is disposed between the restraint cap 408 and the mandrel 410, wherein the exterior cylindrical body of the exterior shaft 518 is inserted within the wear sleeve 214 between the restraint cap 408 and the mandrel 410. Also, the mandrel 410 may be configured to expand (or enlarge, or spread, or widen) so as to grasp the wear sleeve 214 when the exterior shaft 518 is tightened so as to pull the wear sleeve 214 toward the restraint cap 408. In some instances, as shown in FIG. 4, the restraint cap 408 firmly contacts the outer edge of the sleeve housing 212, and the mandrel 410 firmly contacts the outer edge of the back end of the wear sleeve 214 when the mandrel 410 expands to grasp the wear sleeve 214 when the exterior shaft 518 is tightened such that the wear sleeve 214 is pulled toward the restraint cap 408. Also, the first fastener (or front nut) 512 is firmly tightened against the restraint cap 408 so as to provide compression (or pinching) of the wear sleeve 214 between the restraint cap 408 and the mandrel 410 along the length of the interior shaft 514. Also, in some instances, the wear sleeve 214 may then be removed from the tail-rotor hub assembly 404 by slidably withdrawing (or slidably disengaging, or disjoining) the wear sleeve 214 from the tail-rotor hub assembly 404 with the sleeve puller tool 308. Thus, in some instances, the mandrel 410 is configured to expand (or enlarge, or spread, or widen) when the exterior shaft 518 is tightened so that the mandrel 410 firmly grasps (or securely captures) the wear sleeve 214 between the restraint cap 408 and the mandrel 410.

In some implementations, as shown in reference to FIGS. 4-5, the tail-rotor hub assembly 404 has the sleeve housing 212, and the wear sleeve 214 is firmly engaged within the sleeve housing 212. As such, with use of the sleeve puller tool 308, the wear sleeve 214 may be slidably withdrawn from the tail rotor bracket 210 of the tail-rotor hub assembly 404, e.g., by disengaging the wear sleeve 214 from the sleeve housing 212 by actively tightening the exterior sleeve 518 toward the restraint cap 408. In various instances, the first end of the exterior shaft 518 has a threaded aperture that engages with a threaded surface of the interior shaft 514 so that the exterior shaft 518 rotates around the interior shaft 514 to thereby move along the length of the interior shaft 514 toward the restraint cap 408.

In various implementations, as shown in FIG. 5, the sleeve puller tool 308 may also have a puller wrench armature 520 configured to couple to the first end of the exterior shaft 518 by way of a channel 524 formed in a side of the restraint cap 408. Also, the exterior shaft 518 may be tightened toward the restraint cap 408 with actuated movement of the wrench armature 520 around the interior shaft 514 so as to grasp (or capture) the wear sleeve 214 when the exterior shaft 518 is tightened so as to thereby pull (or slidably shift) the wear sleeve 214 toward the restraint cap 408 along the length of the interior shaft 514.

In various implementations, as shown in FIG. 5, the mandrel 410 may have one or more moveable sections 528 that protrude outward away from the interior shaft 514 so as to firmly contact the wear sleeve 214 when the mandrel 410 expands due to tightening of the exterior shaft 518 toward the restraint cap 408 along the length of the interior shaft 514. Also, in some instances, the one or more moveable sections 528 may be referred to as collapsible lugs, wherein the one or more moveable sections 528 are collapsed when the mandrel 410 is inserted within (and passes through) the wear sleeve 214. Then, during tightening of the exterior shaft 518, the mandrel 410 expands so that the one or more moveable sections 528 protrude outward away from the interior shaft 514 and contact the outer edge of the back end of the wear sleeve 214, as shown in FIG. 4. Thus, in some use-case scenarios, the mandrel 410 may operate and/or function as a wedge that causes protrusion of the one or more moveable sections 528 toward the wear sleeve 214. As such, when activated, the one or more moveable sections 528 are pressed toward the wear sleeve 214 so as to firmly grasp (or securely capture) the wear sleeve 214 by way of physical contact of the one or more moveable sections 528 with the outer edge of the wear sleeve 214.

In various implementations, the wear sleeve removal tool or sleeve puller tool 308 and various components thereof may be formed of and/or manufactured with various types of materials, such, e.g., plastics, thermo-plastics, metals, alloys, or similar materials. In some instances, some components of the sleeve puller tool 308 may be formed with high-strength materials, and some other components may be formed with pliable materials. For instance, in some scenarios, the mandrel 410 and the one or more moveable sections (or collapsible lugs) 528 may be formed with a softer, more pliable material, such as, e.g., brass, aluminum, or similar, to ease insertion of the sleeve puller tool 308 into the wear sleeve 214.

Figure 6:
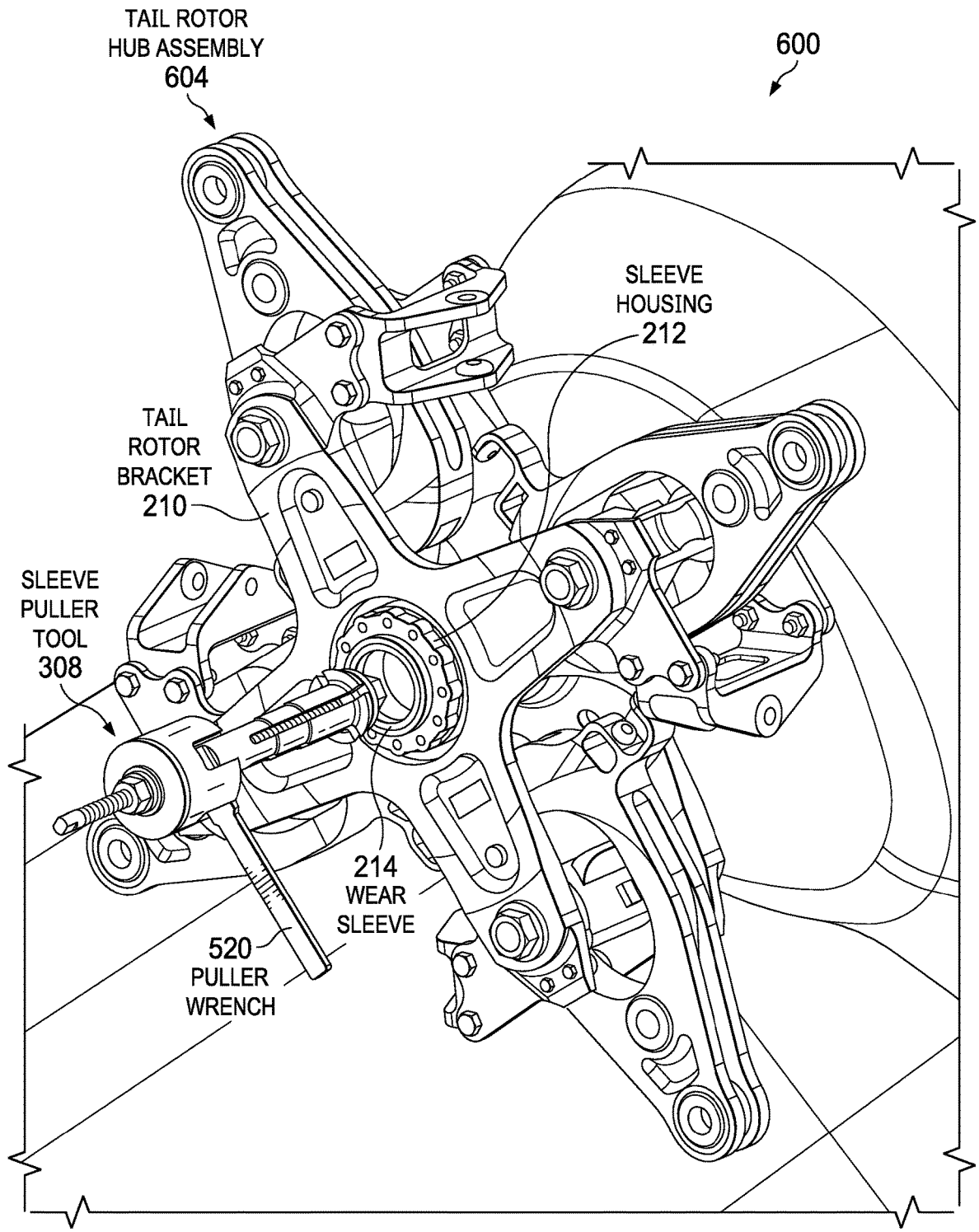
FIG. 6 illustrates a diagram of a wear sleeve removal tool and a tail rotor hub assembly in accordance with various implementations described herein.

FIG. 6 illustrates a diagram 600 of the tail rotor hub assembly 604 and the wear sleeve removal tool 308 in accordance with various implementations described herein.

In some implementations, as described herein, the tail rotor hub assembly 604 has various components, including, e.g., the tail rotor bracket 210 and sleeve housing 212 that is configured to securely receive the wear sleeve 214. In various use-case scenarios, the wear sleeve 214 may provide a shielding buffer sleeve between the tail rotor blades and the interior surface of the sleeve housing 212 for absorbing high-speed impact and shock during rotation of the tail rotor blades. Periodically, the wear sleeve 214 may be removed for maintenance purposes, and thus, the wear sleeve removal tool (or sleeve puller tool) 308 is inserted within the hollow tubular cavity defined by the interior region of the wear sleeve 214 for subsequent withdrawal from the sleeve housing 212.

In some implementations, prior to insertion, the wear sleeve removal tool (or sleeve puller tool) 308 is aligned with the interior surface of the hollow tubular cavity defined by the interior region of the wear sleeve 214. This alignment allows for the sleeve puller tool 308 to be slidably inserted within the wear sleeve 214 so as to pass through the interior region of the wear sleeve 214. When inserted, the sleeve puller tool 308 may be operated in a manner as described herein to firmly grasp (or securely capture) the wear sleeve 214 for subsequent removal (or withdrawal) of the wear sleeve 214 from the sleeve housing 212.

Figure 7A:
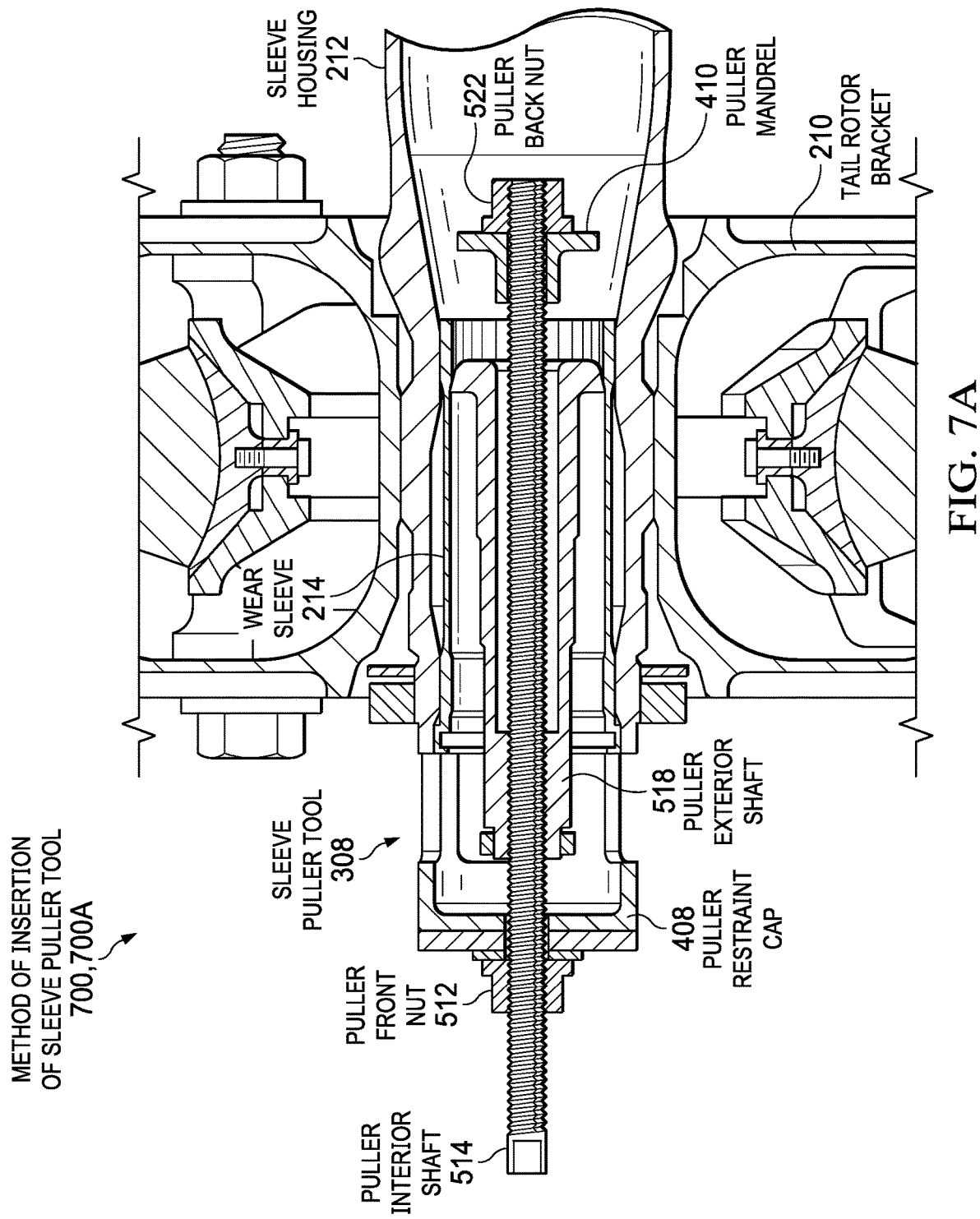
FIGS. 7A-7E illustrate diagrams of a method for removing a wear sleeve from a tail rotor hub assembly in accordance with implementations described herein.
Figure 7B:
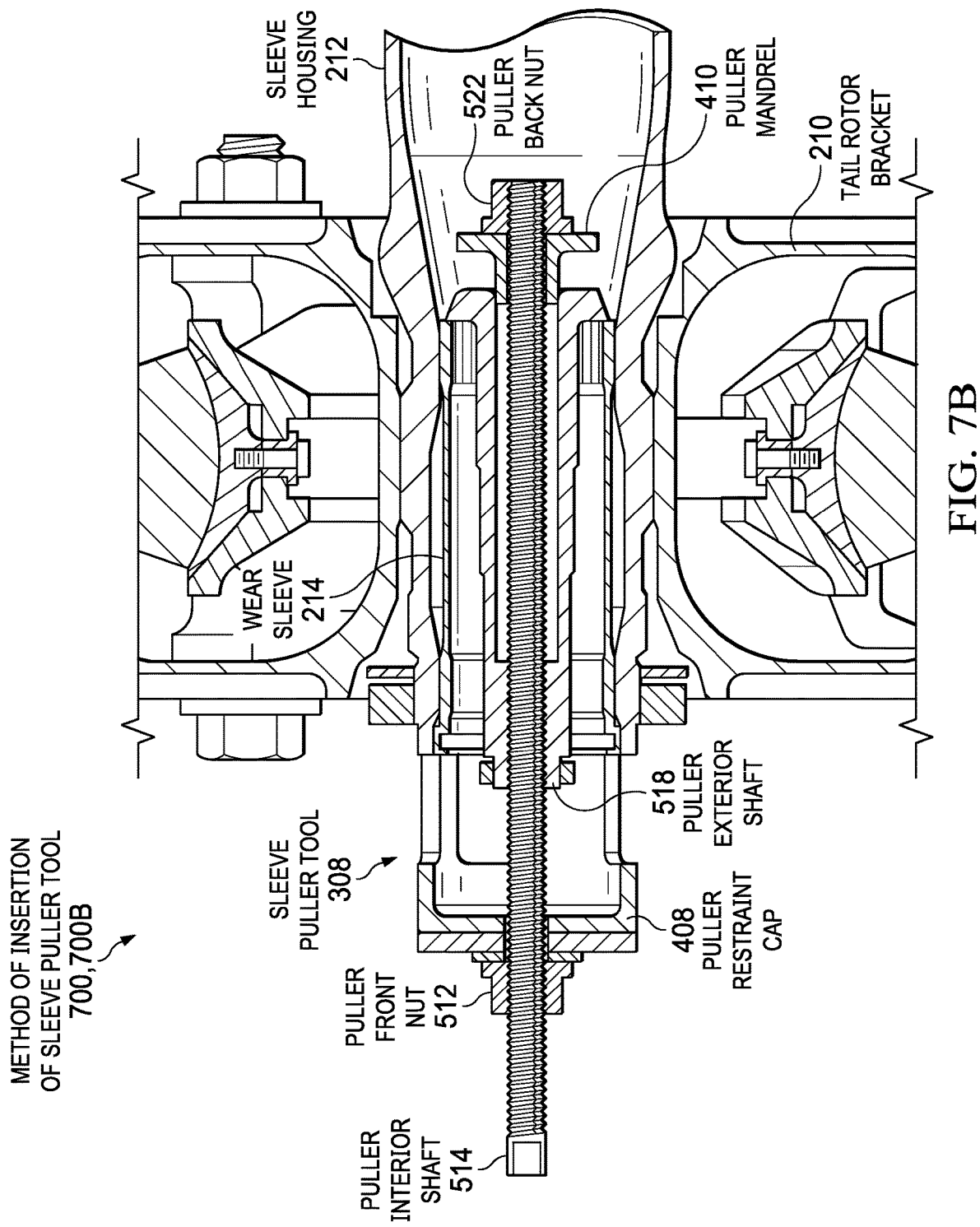
Figure 7C:
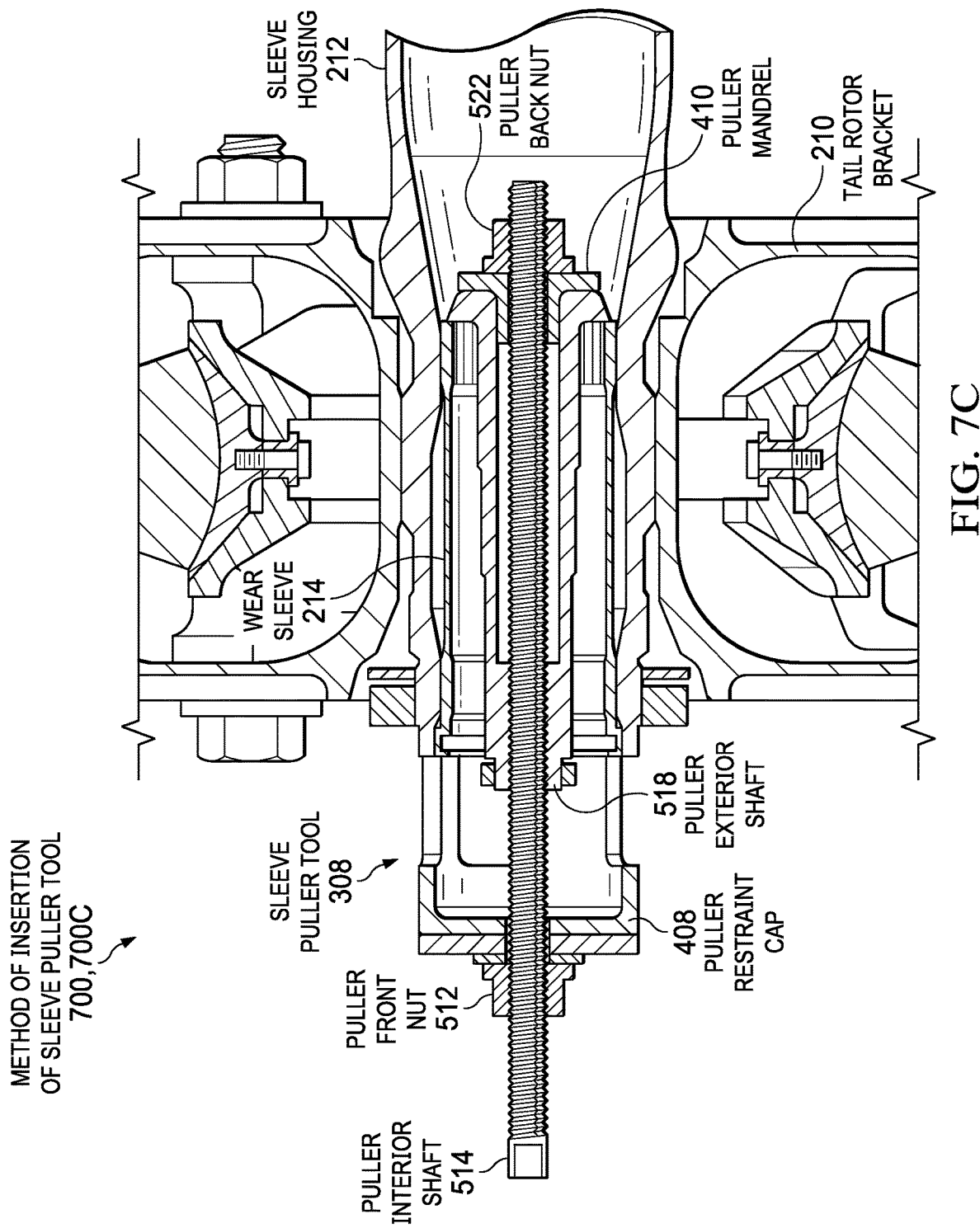
Figure 7D:
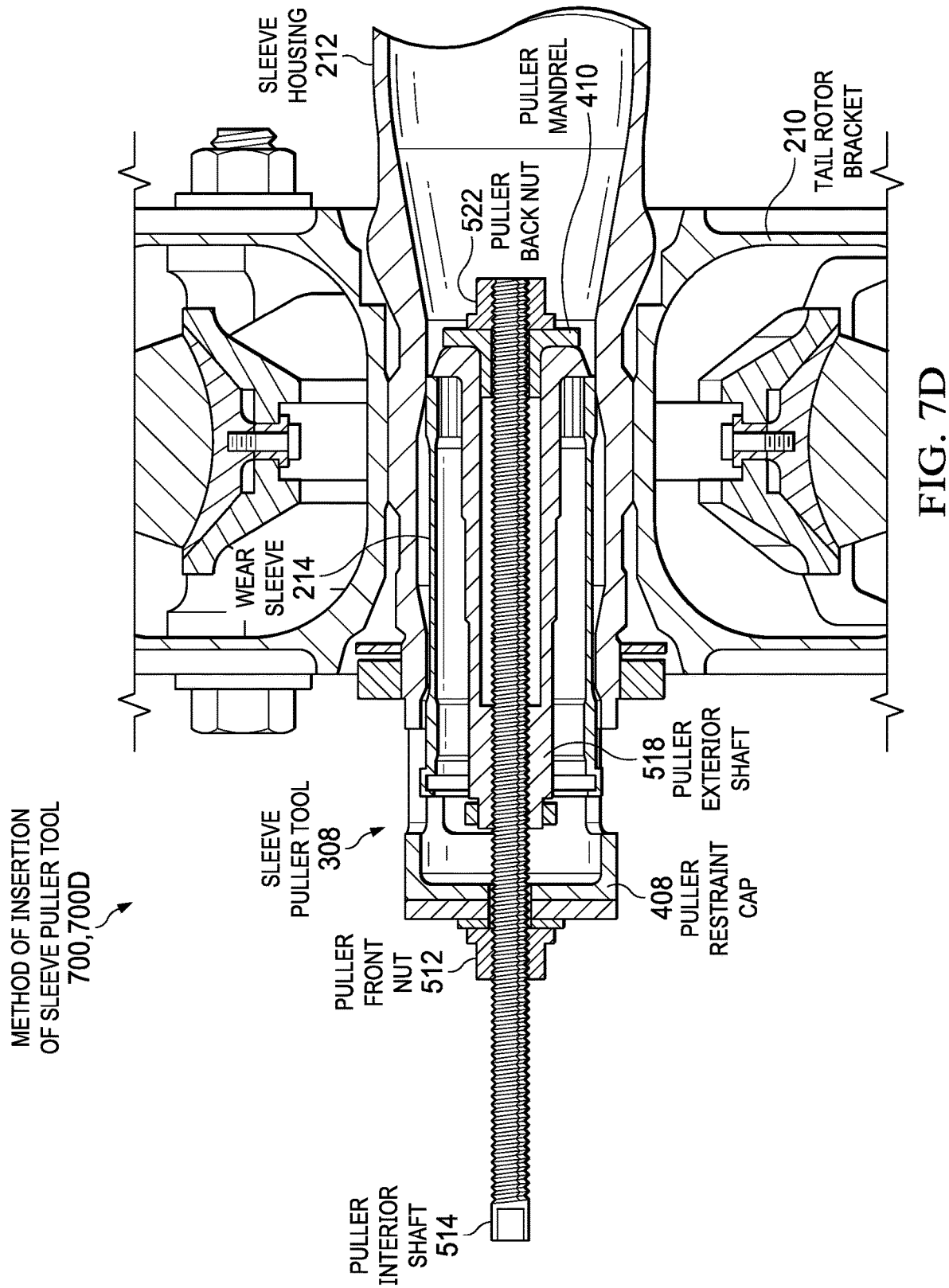
Figure 7E:
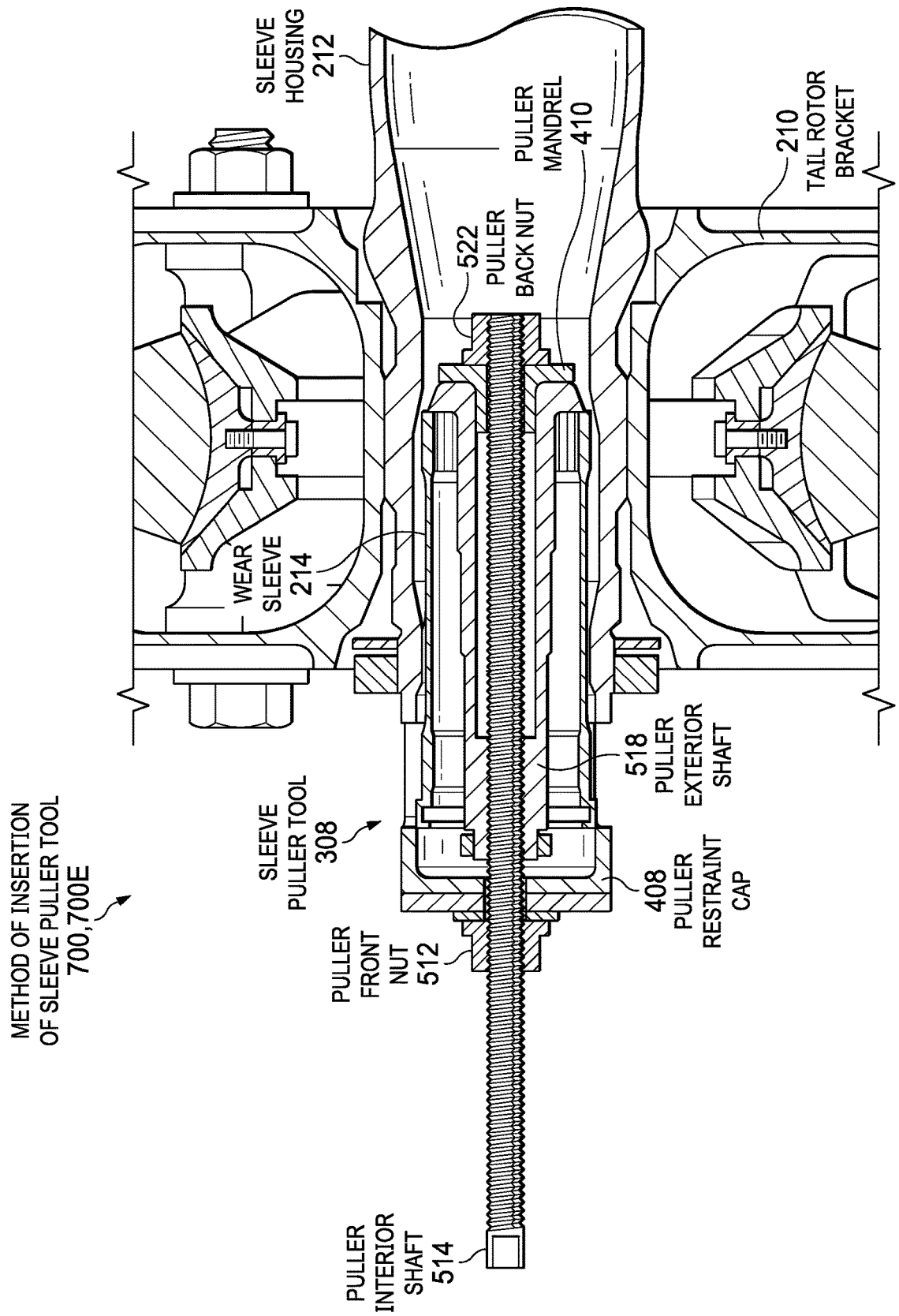

FIGS. 7A-7E illustrate a series of diagrams of a method 700 for removing a wear sleeve from a tail rotor hub assembly in accordance with various implementations described herein. In particular, FIG. 7A shows a first stage 700A of inserting the wear sleeve removal tool (or sleeve puller tool) within the tail rotor hub assembly, FIG. 7B shows a second stage 700B of inserting the wear sleeve removal tool (or sleeve puller tool) within the tail rotor hub assembly, and FIG. 7C shows a third stage 700A of securing the wear sleeve removal tool (or sleeve puller tool) to the tail rotor hub assembly. Further, FIG. 7D shows a fourth stage 700D of removing (or withdrawing) the wear sleeve from the tail rotor hub assembly with the wear sleeve removal tool (or sleeve puller tool), and also, FIG. 7E shows a fifth stage 700E of removing (or withdrawing) the wear sleeve from the tail rotor hub assembly with the wear sleeve removal tool (or sleeve puller tool).

It should be understood that even though method 700 indicates a particular order of operation execution, in some cases, various portions of operations may be executed in a different order, and on different systems. In other cases, additional operations and/or steps may be added to and/or omitted from method 700. Also, method 700 may be implemented with various components, as described in FIGS. 1-6.

As described herein in reference to FIGS. 7A-7E, method 700 may be utilized as a wear sleeve removal technique for removing (or withdrawing) the wear sleeve from the tail rotor hub assembly of the rotorcraft with the wear sleeve removal tool, which may be referred to as a puller tool assembly and/or as the sleeve puller tool 308.

As shown in FIG. 7A, method 700 may provide the puller tool assembly, such as sleeve puller tool 308, with the interior shaft 514 slidably engaged within the tubular passage of the exterior shaft 518. In some instances, as described herein, the exterior shaft 518 may include a first cylindrical body, which may be referred to as an exterior cylindrical body. Also, method 700 may couple the restraint cap 408 to the interior shaft 514 at the first open end of the exterior cylindrical body of the exterior shaft 518 with a fastener, which may be referred to as a first fastener or the front end nut 512. Also, method 700 may couple the mandrel 410 to the interior shaft 514 at the second end of the exterior shaft 518.

Also, as shown in FIG. 7A, method 7000 may insert the exterior cylindrical body of the exterior shaft 518 within the wear sleeve 514 of a tail-rotor hub assembly for a rotorcraft between the restraint cap 408 and the mandrel 410. Also, the exterior shaft 518 along with the mandrel 410 may be slidably inserted within the wear sleeve 214 so that the mandrel 410 passes through the interior region of the wear sleeve 214. When inserted, the sleeve puller tool 308 may be operated in a manner as described herein so as to firmly grasp (or securely capture) the wear sleeve 214 for subsequent removal (or withdrawal) of the wear sleeve 214 from the sleeve housing 212. In some instances, when the mandrel is disengaged, then the diameter of the sleeve puller tool is less than an inner diameter of the wear sleeve.

As shown in FIG. 7B, method 700 may secure the wear sleeve 214 between the restraint cap 408 and the mandrel 410 by tightening the exterior shaft 518 along the length of the interior shaft 408. As shown in FIG. 7C, as the exterior shaft 518 is tightened, method 700 operates to compress the rear fastener 522 against a backside of the mandrel 410, which also causes the restraint cap 408 to compress against the outer edge of the sleeve housing 212, so that during tightening, the interior shaft 514 continuously protrudes from the backside of the rear fastener 522. Also, as shown in FIGS. 7A-7C, the mandrel 410 is configured to expand so as to firmly grasp (or securely capture) the wear sleeve 214 during tightening of the exterior shaft 518 so as to pull the wear sleeve 214 toward the restraint cap 408. In some instances, when the mandrel engages the inner diameter of the wear sleeve, the sleeve puller tool is configured to expand so as to provide a firm fit within the wear sleeve.

In reference to FIG. 5, the mandrel 410 has one or more moveable sections 528 that protrude outward away from the interior shaft 514 so as to firmly contact the wear sleeve 214 when the mandrel 410 expands due to the tightening of the exterior shaft 518 toward the restraint cap 408 along the length of the interior shaft 514. In FIG. 7A, the one or more moveable sections 528 are collapsed when the mandrel 410 is inserted within (and passes through) the wear sleeve 214. Then, in FIG. 7B, during tightening of the exterior shaft 518, the mandrel 410 expands so that the one or more moveable sections 528 protrude outward away from the interior shaft 514 and then contact the outer edge of the back end of the wear sleeve 214, as shown in FIG. 4. Thus, in various use-case scenarios, when activated, the one or more moveable sections 528 are pressed toward the wear sleeve 214 so as to firmly grasp (or securely capture) the wear sleeve 214 by way of actual physical contact of the one or more moveable sections 528 with the outer edge of the wear sleeve 214. Also, FIG. 7C shows a continual tightening of the exterior shaft 518 for further compression of the one or more moveable sections 528 against the outer edge of the wear sleeve 214.

As shown in FIG. 7D, method 700 may begin removing the wear sleeve 214 from the sleeve housing 212 of the tail rotor bracket 210. As described herein, the tail-rotor hub assembly uses the sleeve housing 212 to firmly engage the wear sleeve 214 so as to securely fasten the wear sleeve 214 within the sleeve housing 212. Therefore, as shown in reference to FIGS. 7D-7E, the wear sleeve 214 is slidably withdrawn from the tail-rotor hub assembly by disengaging the wear sleeve 214 from the sleeve housing 212 of the tail rotor bracket 210 with the sleeve puller tool 308. In some use-case scenarios, the second end of the exterior shaft 518 may be inserted within the wear sleeve 412 so that the wear sleeve 412 is disposed between the restraint cap 408 and the mandrel 410. Also, the mandrel 410 is configured to expand when the exterior shaft 418 is firmly tightened toward the restraint cap 408 so as to secure the wear sleeve 412 between the restraint cap 408 and the mandrel 410 along the length of the interior shaft 514. Also, the wear sleeve 214 may be removed from the tail-rotor hub assembly by withdrawing (or extracting, or disengaging) the sleeve puller tool 308 from the tail-rotor hub assembly of the rotorcraft.

Moreover, in reference to FIGS. 7C-7E, the wrench armature 520 (as shown in FIGS. 5-6) may be coupled to the first end of the exterior shaft 518 by way of the channel 524 formed in the restraint cap 408. As described herein, the exterior shaft 518 is tightened toward the restraint cap 408 with actuated movement of the wrench armature 520 around the interior shaft 514 so as to grasp (or capture) the wear sleeve 412 when the exterior shaft 518 is tightened, which operates so as to pull (or extract) the wear sleeve 412 toward the restraint cap 408 along the length of the interior shaft 514. In various instances, the wear sleeve 412 may be extracted from the tail rotor hub assembly and into the restraint cap 408.

Some advantages and significant features associated with the various wear sleeve removal schemes and techniques described herein include utilizing the sleeve puller tool along with the mandrel to disengage, pull and withdraw the wear sleeve in a safe, intelligible and expeditious way. Also, other advantages and significant features associated with using the various wear sleeve removal schemes and techniques described herein include ease of use along with no need to uninstall the tail rotor gear box, which provides for a significant reduction in maintenance time, cost, inefficiency and difficulty.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device having a puller tool assembly for removing a wear sleeve from a tail-rotor hub assembly of a rotorcraft. The puller tool assembly may have an interior shaft slidably engaged within an exterior cylindrical body. The puller tool assembly may have a restraint cap coupled to the interior shaft at a first end of the exterior shaft with a fastener. The puller tool assembly may have a mandrel coupled to the interior shaft at a second end of the exterior shaft. The exterior cylindrical body may be inserted within the wear sleeve between the restraint cap and the mandrel. The mandrel may expand to grasp the wear sleeve when the exterior shaft is tightened so as to pull the wear sleeve toward the restraint cap.

Described herein are various implementations of a method for removing a wear sleeve from a tail-rotor hub assembly of a rotorcraft. The method may provide a puller tool assembly with an interior shaft slidably engaged within a tubular passage of an exterior cylindrical body. The method may couple a restraint cap to the interior shaft at a first open end of the exterior cylindrical body with a fastener. The method may couple a mandrel to the interior shaft at a second end of the exterior shaft. The method may insert the exterior cylindrical body within a wear sleeve of a tail-rotor hub assembly for a rotorcraft between the restraint cap and the mandrel. The method may secure the wear sleeve between the restraint cap and the mandrel by tightening the exterior shaft, and the mandrel may expand to grasp the wear sleeve when the exterior shaft is tightened so as to pull the wear sleeve toward the restraint cap.

Described herein are various implementations of a device having a puller tool assembly for removing a wear sleeve from a tail-rotor hub assembly of a rotorcraft. The puller tool assembly may have an exterior shaft having a first cylindrical body with a hollow tubular passage disposed between a first open end and a second open end. The puller tool assembly may have an interior shaft having a second cylindrical body slidably engaged within the hollow tubular passage of the exterior shaft. The puller tool assembly may have a restraint cap coupled to the interior shaft at the first end of the exterior shaft with a first fastener. The puller tool assembly may have a mandrel coupled to the interior shaft at the second end of the exterior shaft with a second fastener.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. A device comprising:
    a puller tool assembly for removing a wear sleeve from a tail-rotor hub assembly of a rotorcraft, wherein the puller tool assembly comprises:
        an interior shaft slidably engaged within an exterior cylindrical body, the exterior cylindrical body including a first end and a second end opposite the first end and further including an exterior shaft comprising a first cylindrical body with a hollow tubular passage disposed between the first end and the second end;
        a mandrel coupled to the interior shaft at the second end of the exterior shaft; and
        a restraint cap coupled to the interior shaft at a first end of the exterior shaft, wherein a second end of the exterior shaft is configured to be inserted within the wear sleeve of the tail-rotor hub assembly so that the wear sleeve is disposed between the restraint cap and the mandrel, and
    wherein the mandrel is configured to expand to grasp the wear sleeve when the exterior cylindrical body is tightened and to pull the wear sleeve toward the first end of the exterior cylindrical body.

2. The device of claim 1, wherein:
    the interior shaft includes a second cylindrical body slidably engaged within the hollow tubular passage of the first cylindrical body of the exterior shaft.

3. The device of claim 1, wherein:
    the restraint cap is coupled to the interior shaft at the first end of the exterior shaft with a first fastener, and
    the mandrel is coupled to the interior shaft at the second end of the exterior shaft with a second fastener.

4. The device of claim 1, wherein the mandrel is configured to expand to grasp the wear sleeve when the exterior shaft is tightened to extract the wear sleeve from the tail-rotor hub assembly by pulling the wear sleeve toward the restraint cap along a length of the interior shaft.

5. The device of claim 1, wherein:
    the wear sleeve is removed from the tail-rotor hub assembly by withdrawing the puller tool assembly from the tail-rotor hub assembly.

6. The device of claim 5, wherein:
    the tail-rotor hub assembly includes a sleeve housing,
    the wear sleeve is engaged within the sleeve housing, and
    the wear sleeve is withdrawn from the tail-rotor hub assembly by disengaging the wear sleeve from the sleeve housing with the puller tool assembly.

7. The device of claim 1, wherein:
    the puller tool assembly comprises a wrench armature coupled to the first end of the exterior cylindrical body by way of a channel formed in a restraint cap coupled to the interior shaft at the first end of the exterior cylindrical body, and
    the exterior cylindrical body is configured to be tightened toward the restraint cap with actuated movement of the wrench armature around the interior shaft to grasp the wear sleeve when the exterior cylindrical body is tightened to pull the wear sleeve toward the restraint cap along a length of the interior shaft.

8. The device of claim 1, wherein:
    the mandrel includes moveable sections that protrude outward away from the interior shaft to contact the wear sleeve when the mandrel expands due to tightening of the exterior cylindrical body toward a restraint cap coupled to the interior shaft at the first end of the exterior cylindrical body along a length of the interior shaft.

9. A device comprising:
    a puller tool assembly for removing a wear sleeve from a sleeve housing of a tail-rotor hub assembly of a rotorcraft, wherein the puller tool assembly comprises:
        an exterior shaft including a first cylindrical body with a hollow tubular passage disposed between a first open end and a second open end;
        an interior shaft including a second cylindrical body slidably engaged within the hollow tubular passage of the exterior shaft;
        a restraint cap coupled to the interior shaft at the first open end of the exterior shaft; and a mandrel coupled to the interior shaft at the second open end of the exterior shaft;

wherein the mandrel is configured to expand to grasp the wear sleeve when the exterior shaft is tightened and the wear sleeve is withdrawn from the tail-rotor hub assembly by disengaging the wear sleeve from the sleeve housing with the puller tool assembly.

10. The device of claim 9, wherein:

the second open end of the exterior shaft is configured to be inserted within the wear sleeve of the tail-rotor hub assembly so that the wear sleeve is disposed between the restraint cap and the mandrel, and the wear sleeve is removed from the tail-rotor hub assembly by withdrawing the puller tool assembly from the tail-rotor hub assembly.

11. The device of claim 9, wherein:

the puller tool assembly comprises a wrench armature coupled to the first open end of the exterior shaft by way of a channel formed in the restraint cap, and the exterior shaft is configured to be tightened toward the restraint cap with actuated movement of the wrench armature around the interior shaft so as to grasp the wear sleeve when the exterior shaft is tightened so as to pull the wear sleeve toward the restraint cap along a length of the interior shaft.

12. The device of claim 9, wherein:

the mandrel includes moveable sections that protrude outward away from the interior shaft so as to contact the wear sleeve when the mandrel expands due to tightening of the exterior shaft toward the restraint cap along a length of the interior shaft.

13. A device comprising:

a puller tool assembly for removing a wear sleeve from a tail-rotor hub assembly of a rotorcraft, wherein the puller tool assembly comprises:

an interior shaft slidably engaged within an exterior cylindrical body, the exterior cylindrical body including a first end and a second end opposite the first end;

a mandrel coupled to the interior shaft at the second end of the exterior cylindrical body, wherein the mandrel is configured to expand to grasp the wear sleeve when the exterior cylindrical body is tightened and to pull the wear sleeve toward the first end of the exterior cylindrical body; and a wrench armature coupled to the first end of the exterior cylindrical body by way of a channel formed in a restraint cap coupled to the interior shaft at the first end of the exterior cylindrical body, wherein the exterior cylindrical body is configured to be tightened toward the restraint cap with actuated movement of the wrench armature around the interior shaft to grasp the wear sleeve when the exterior cylindrical body is tightened to pull the wear sleeve toward the restraint cap along a length of the interior shaft.

* * * * *